United States Patent [19]

Patel et al.

[11] Patent Number: 4,782,519
[45] Date of Patent: Nov. 1, 1988

[54] METHOD AND APPARATUS FOR ENHANCING THE OPERATING CAPABILITIES OF A TELEPHONE SWITCHING SYSTEM

[75] Inventors: Rajendra Patel, Plano; Kenneth A. Lauffenburger, Carrollton; David W. Thorn, Richardson; Donald D. Binford, Jr., Plano; Zye-Kong Cheng, Richardson; Yeong-Haw Yang, Plano; Gerald K. Coley, Terrell; Charles C. Miller, Allen, all of Tex.

[73] Assignee: Network Access Corporation, Richardson, Tex.

[21] Appl. No.: 866,165

[22] Filed: May 22, 1986

[51] Int. Cl.⁴ ............... H04Q 3/495; H04Q 3/70; H04Q 3/76; H04Q 3/78

[52] U.S. Cl. ............... 379/221; 340/827; 379/207; 379/244; 379/246; 379/269; 379/275

[58] Field of Search ............... 379/221, 207, 113, 230, 379/112, 269, 244, 246, 275; 340/827; 370/58

[56] References Cited

U.S. PATENT DOCUMENTS

| | | | |
|---|---|---|---|
| 3,309,467 | 3/1967 | Gorgas et al. | 340/827 |
| 3,916,124 | 10/1975 | Joel, Jr. | 379/113 |
| 4,156,798 | 5/1979 | Doelz | 370/94 |
| 4,611,096 | 9/1986 | Asmuth et al. | 379/207 |
| 4,685,127 | 8/1987 | Miller et al. | 379/221 |
| 4,686,698 | 8/1987 | Tompkins et al. | 379/53 |
| 4,704,724 | 11/1987 | Krishnau et al. | 379/221 |
| 4,720,854 | 1/1988 | Sand | 379/269 |

Primary Examiner—Thomas W. Brown
Attorney, Agent, or Firm—Harold E. Meier

[57] ABSTRACT

A method and apparatus is described for providing extended subscriber features, e.g., equal access, to otherwise non-conforming central offices of a telephone switching system. According to the invention, a register module is interposed between the subscriber line and an input of the central office for intercepting digits from the subscriber line intended for the central office and for receiving subscriber information from the central office identifying the subscriber line. The register module includes a memory having a plurality of address locations and a control circuit for analyzing the intercepted digits to determine whether processing of the subscriber call requires an extended subscriber feature. If so, the intercepted digits are processed to generate a coded signal, the coded signal including the address location where the stored digits and the subscriber information resides in the memory. The coded signal is then used by the marker in the central office to select an appropriate outgoing trunk to complete the subscriber call. An associated trunk module interposed between the switch element of the central office and the outgoing trunks receives the coded signal and in response thereto polls the register module to request transmission of the digits and the subscriber information. Upon receipt of this data, the trunk module outputs a signal to the selected trunk.

26 Claims, 7 Drawing Sheets

METHOD AND APPARATUS FOR ENHANCING THE OPERATING CAPABILITIES OF A TELEPHONE SWITCHING SYSTEM

TECHNICAL FIELD

The present invention relates to telecommunications systems and more particularly to a method and apparatus for enhancing the operation of an existing central office in a telephone switching system to provide extended subscriber features.

BACKGROUND OF THE INVENTION

"Equal access," a mandate imposed by the divestiture of American Telegraph & Telephone Co. ("AT&T"), has facilitated the growth of a large number of private interexchange carriers. To provide long distance service, these carriers must interface with existing "central office" equipment. As is well known in the prior art, a "central office" includes a plurality of switching elements (e.g., a crossbar or step-by-step switch) for connecting an incoming subscriber call from a subscriber line to one of a plurality of outgoing trunks. The central office also includes control circuitry (e.g., originating registers and markers) for receiving and processing called digits from the subscriber and in response thereto controlling the switch element to select an appropriate outgoing trunk to complete the subscriber call.

Existing central office equipment is presently incapable of adequately providing "equal access" and other extended subscriber features to otherwise non-conforming central offices. Accordingly, deregulation and increasing competitive pressures have left central office operators with the option of either replacing older technology or upgrading present equipment in order to meet the demands of both current and future telecommunications requirements. Because replacement or upgrading of existing central office equipment is often cost prohibitive, many operators will not be able to provide extended subscriber features to their subscribers.

Accordingly, there exists a need for enhancing the operating capabilities of a telecommunications switching system to enable existing central offices to offer extended subscriber features, such as equal access, while obviating the replacing or upgrading of existing technology.

BRIEF SUMMARY OF THE INVENTION

According to one embodiment of the invention, a method and apparatus for enhancing the operating capabilities of an existing central office in a telephone switching system is described. The central office is enhanced through use of at least one register module interposed between the subscriber line and the originating registers (or equivalent structure) of the office. Upon seizure of an originating register by the subscriber going off-hook, the register module supplies a dialtone to the subscriber line and receives line information from the central office identifying this line. The subscriber line information is then used to address a database in the register module from which the subscriber's telephone or other identification number and (pre-subscribed) long distance carrier are retrieved. This subscriber information is then stored in a memory of the register module having a plurality of address locations.

As the subscriber begins to dial, the register module intercepts the called digits to determine whether processing of the call requires as extended subscriber feature, e.g., equal access. Received digits are also stored at the address location in the memory where the subscriber information resides. If processing of the call requires an extended subscriber feature, the register module transmits to the originating register a coded signal including the address location in the memory where the digits and the subscriber information reside. The coded signal also includes information used by the crossbar office to route the call to a trunk as well as information identifying the particular register module that is processing the signal.

According to a feature of the invention, the existing central office also includes a call processing "trunk" module interposed between the crossbar switch of the office and the plurality of outgoing trunks. The trunk module receives the coded signal from the crossbar switch and in response thereto polls the register module to transmit the actual digits and the subscriber information via a high-speed datalink. The trunk module then outputs signals on the selected trunk in a format depending on the subscriber's long distance carrier.

According to another feature of the invention, data messages are transmitted between the various system modules (and tasks therein) via a unique messaging structure and routing method. In particular, each of the above-identified modules is defined as a "node" of a nodal network, with each of the nodes having one or more ports associated therewith for communicating with other nodes of the network. Each of the nodes may also have one or more tasks associated therewith. According to the invention, a method for routing data between nodes of the network uses a primary routing table at each node of the network for identifying a port of the node from which data messages should be sent to reach each other node of the network via a shortest possible path. A secondary routing table may also be generated at each node for determining which port of the network should be used to route the data message to each other node of the network via a next shortest possible path. Information in the data message is then evaluated to control routing of the data message between nodes (i.e., modules) and between tasks within a given node.

Each data message to be routed preferably includes a class field, for storing information to control routing of the data message, and a destination node field for identifying a destination node where the data message is to be routed. According to the invention, message routing between modes is accomplished by using the information in the class and destination fields to (a) identify the port required for most efficient routing if, in fact, a valid route exists, and (b) to identify whether the message requires external routing (i.e., routing to another node) or internal routing to another task at the same node.

In operation, a method for routing data between nodes of the network begins by compiling the primary and secondary routing tables. A data message to be routed is then generated at a source node, the data message including information in the class field used to control routing of the data message and information in the destination node field for identifying the destination node where the message is to be routed. According to the method, the information in the class and destination fields is used to identify the port of the node from which the message should be routed to reach the destination node over the shortest possible path. The information is also used to identify whether a valid route exists and whether the message is to be routed externally between nodes of the network or internally between tasks of the source node. Thereafter, the generated route information is used to effect routing of the message between the source and destination nodes.

BRIEF DESCRIPTION OF THE DRAWINGS

For a more complete understanding of the present invention and the advantages thereof, reference is now made to the Description taken in conjunction with the accompanying Drawings in which.

DETAILED DESCRIPTION

Figures 1, 4:
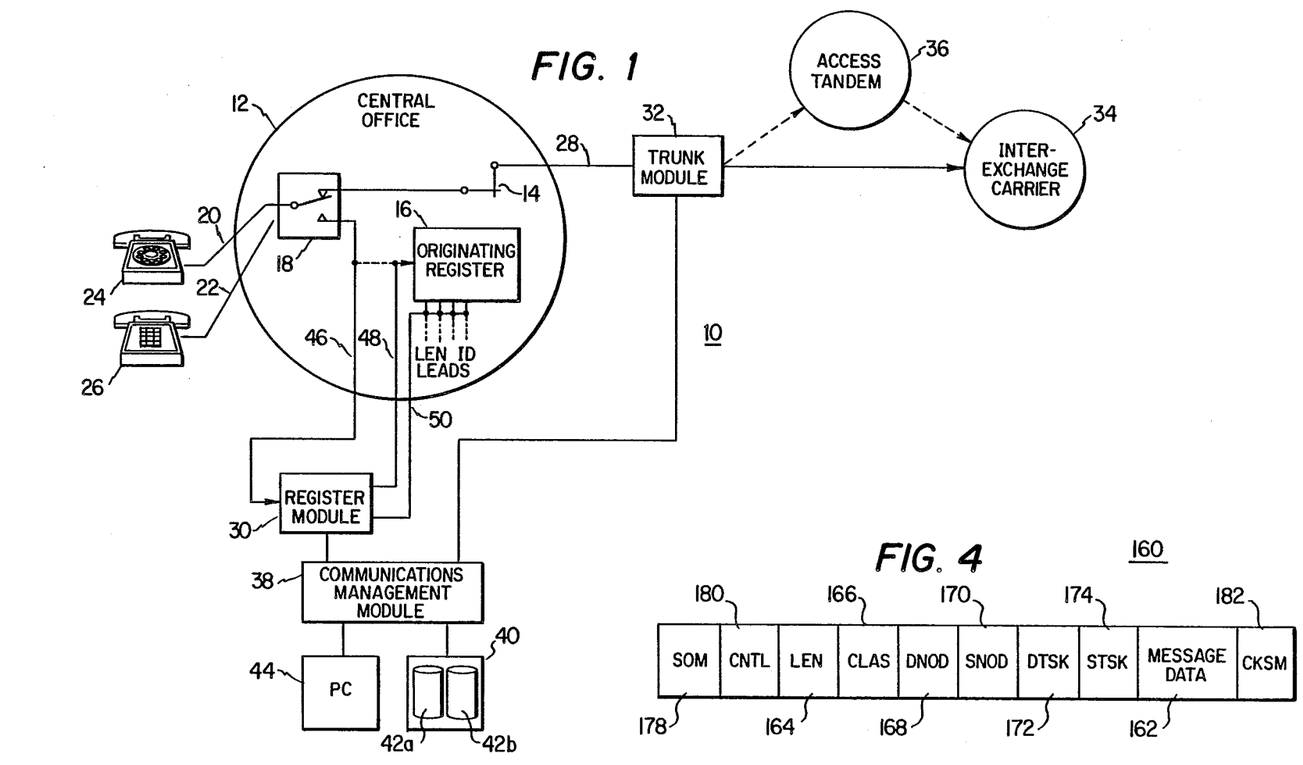
FIG. 1 is a simplified block diagram of the apparatus of the invention for enhancing the operating capabilities of a crossbar-type central office.
FIG. 4 is a representation of a preferred messaging structure used in the present invention to route data between the modules (or tasks therein) of the enhanced central office shown in FIG. 2.

With reference now to the drawings wherein like reference characters designate like or similar parts throughout the several views, FIG. 1 is a simplified block diagram of the apparatus of the present invention for enhancing the operating capabilities of an existing central office in a telephone switching system. As seen in FIG. 1, the switching system 10 includes a conventional central office 12 having at least one crossbar switch element 14, at least one originating register (OR) 16 and a subscriber line link circuit 18. First and second subscriber lines 20 and 22 connect first and second subscribers 24 and 26 to the central office equipment. The central office 12 also includes at least one "marker" circuit (not shown), which is conjunction with the originating register 16 controls the crossbar switch element 14 to select one of a plurality of outgoing trunks 28 to complete the subscriber call.

As also seen in FIG. 1, the originating register 16 receives (from the marker) a parallel input called a line equipment number identification (LENI) code. This code is used by the central office 12 for billing and accounting purposes and uniquely identifies the calling subscriber.

Existing central office equipment 12 is limited in its operating capabilities by dialing restrictions imposed by the digit collection capacity of the originating register 16. This and other limitations of prior art central offices have prevented the offering of extended subscriber features to otherwise non-conforming central offices. As used herein, "extended subscriber features" includes, but is not limited to, equal access, selective toll denial capability, sophisticated call management services (such as selective call screening and forwarding) and common channel signaling. To provide such features, the central office equipment 12 is enhanced according to the method and apparatus of the present invention.

Referring back to FIG. 1, the existing central office 12 of the telephone switching system 10 is enhanced through use of at least one register module 30 interposed between the subscriber lines and the originating register 16. As will be described in more detail below, the register module 30 operates in conjunction with a trunk module 32 to provide extended subscriber features to the subscribers 24 and 26. For purposes of example only, the operation of the register module 30 and the trunk module 32 will be discussed below in the context of providing subscribers with "equal access" directly to one or more interexchange carriers (IC) 34 (e.g., MCI or GTE SPRINT) or indirectly to such interexchange carriers through an access tandem (AT) 36. This example, however, is not meant to be limiting, as the method and apparatus of the invention is capable of providing many types of extended subscriber features as well as other network services and maintenance capabilities normally associated with central office equipment.

The central office 12 also includes a communications management module 38 connected between the register module 30 and the trunk module 32 for facilitating inter-module communications and for serving as a conduit for messaging between the individual modules and external databases (not shown). The central office 12 is also modified to include a file management module 40 connected to the communications management module 38. File management module 40 preferably includes two file management systems 42a and 42b operating in a redundant configuration. Each file management system includes an appropriate processing unit and hard disk storage for maintaining billing records, operational measurements and other system files used in the central office 12. All maintenance and administration functions of the enhanced central office 12 are performed through a maintenance console 44 connected to the communications management module 38. Preferably, the maintenance console 44 is a stand-alone personal computer through which system maintenance and administrative personnel maintain and download system databases, view and control operational requirements, invoke maintenance and perform all other operational functions necessary for system administration.

Although not shown in detail in FIG. 1, it should be appreciated that the enhanced central office will typically include a plurality of register modules 30, a plurality of trunk modules 32, and a plurality of communication management modules 38. Each register module will preferably support up to twenty-four (24) originating registers. The trunk modules, which provide the primary interface between the crossbar switch and the interexchange carrier 34 or access tandem 36, each include a central processing unit and suitable storage for processing analog signals (e.g., E&M Type I or II signaling) and digital signals (e.g., T1 interface). Moreover, it should be appreciated that while FIG. 1 discloses the invention in conjunction with a crossbar-type central office, other types of central offices (e.g., a step-by-step office) may be enhanced to offer extended subscriber features according to the described method and apparatus.

To provide such features as equal access, the register module 30 is connected in series between the originating register 16 and the link circuit 18 (and the subscriber lines 20 and 22) via the buses 46 and 48. The register module 30 is also connected in parallel to the originating register 16 to receive the LENI codes via bus 50. The strategic position of the register module 30 (or adjacent) within the central office 12 enables the apparatus to intercept signaling information from the subscriber line prior to that information being analyzed by the existing central office equipment. This capability, together with the ability to monitor the LENI information, enables the apparatus to analyze, screen and manipulate the signaling information to thereby offer extended subscriber features as well as other network services and maintenance capabilities to the existing central office.

Figure 2:
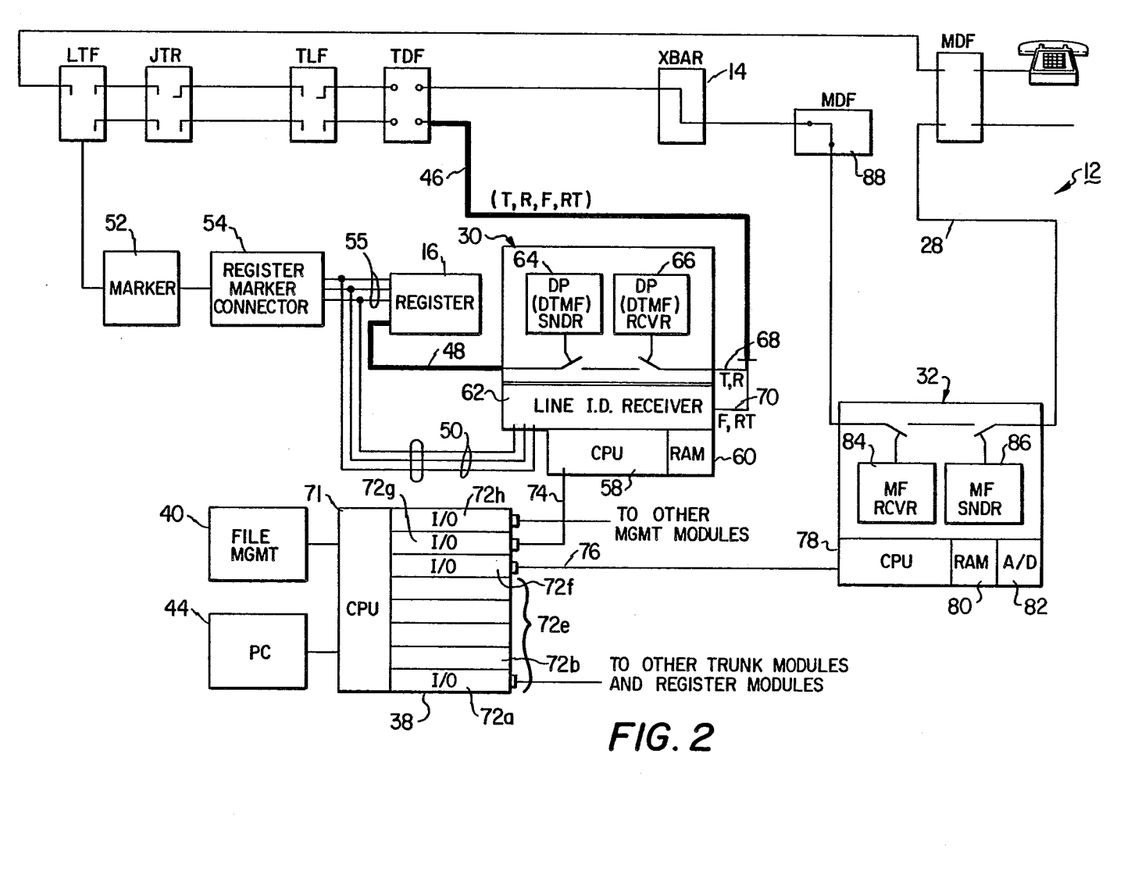
FIG. 2 is a detailed block diagram showing how the register module of the apparatus of FIG. 1 interfaces with pre-existing central office equipment.

Referring now to FIG. 2, a detailed block diagram is provided showing how the register module 30 and trunk module 32 interface with the existing central office equipment. As seen in this FIGURE, the central office equipment 12 includes a marker 52 connected to the originating register 16 via a register/marker connector 54. As is well known in the prior art, the marker 52 determines the terminal locations of calling lines, incoming trunks bidding for service, called lines, and outgoing trunks and equipment, determines the proper route for a call, establishes the connection within the office and passes routing information to the caller, determines the calling line class of service, provides charge classification, and recognizes line busy, trouble, intercept and vacant line conditions. Marker 52 also provides the LENI codes to the originating register 16 via the parallel input bus 55. Incoming subscriber signals from subscriber 24 are processed through the link circuits MDF, LTF, JTR, TLF and TDF (which correspond to the link circuit 18 in FIG. 1) and output on the bus 46.

As seen in FIG. 2, the register module 30 is connected between the buses 46 and 48 to provide the series connection between the originating register 16 and the subscriber lines. The register module includes a central processing unit (CPU) 58 and associated memory 60. The LENI code (corresponding to the calling subscriber) is input to a line identification receiver 62 of the register module 30 via the parallel bus 50. The line identification receiver 62 provides automatic number identification (ANI) from the LENI code input to identify the calling subscriber's telephone number as well as (pre-subscription) information such as the identity of the subscriber's interexchange carrier. This subscriber information is then stored in the memory 60 at an addressable location and, as will be described, later used by the trunk module 32 to route the subscriber call to the subscriber's interexchange carrier.

As also seen in FIG. 2, the register module 30 includes DP/DTMF send and receive circuits 64 and 66 connected between the buses 46 and 48 for providing time-out signals to the originating register 16 to ensure that signaling information is being properly received by the register module 30. As seen in FIG. 2, the bus 46 on the input side of the register module 30 includes tip and ring lines 68, and a plurality of other leads 70 used to validate the selection of the originating register and to control the timing functions of the register following selection.

FIG. 2 also shows how the trunk module 32 is connected to the register module via the communications management module 38. Specifically, communications management module 38 includes a CPU 71 and a plurality of I/O ports 72a–72h, with ports 72a–72e being connected, for example, to other trunk modules or register modules (not shown). Port 72f connects to the central processor 58 of the register module 30 via a high speed datalink 74, while the trunk module 32 connects to port 72g via the high speed datalink 76. Port 72h connects the communications management module 38 to other similar management modules or external databases (not shown). For example, port 72h can be used to connect the module to a common channel signaling (CCS#7) network to meet future telecommunications requirements.

Trunk module 32 includes a central processing unit 78, associated memory 80 and analog-to-digital (A/D) converter circuits 82. Time-out circuits 84 and 86 are also provided to ensure that the trunk module operates within proper timing constraints. The trunk module 32 is connected to an output link circuit 88, which serves to connect the subscriber call via the switch element 14 to the selected trunk 28.

Figure 3:
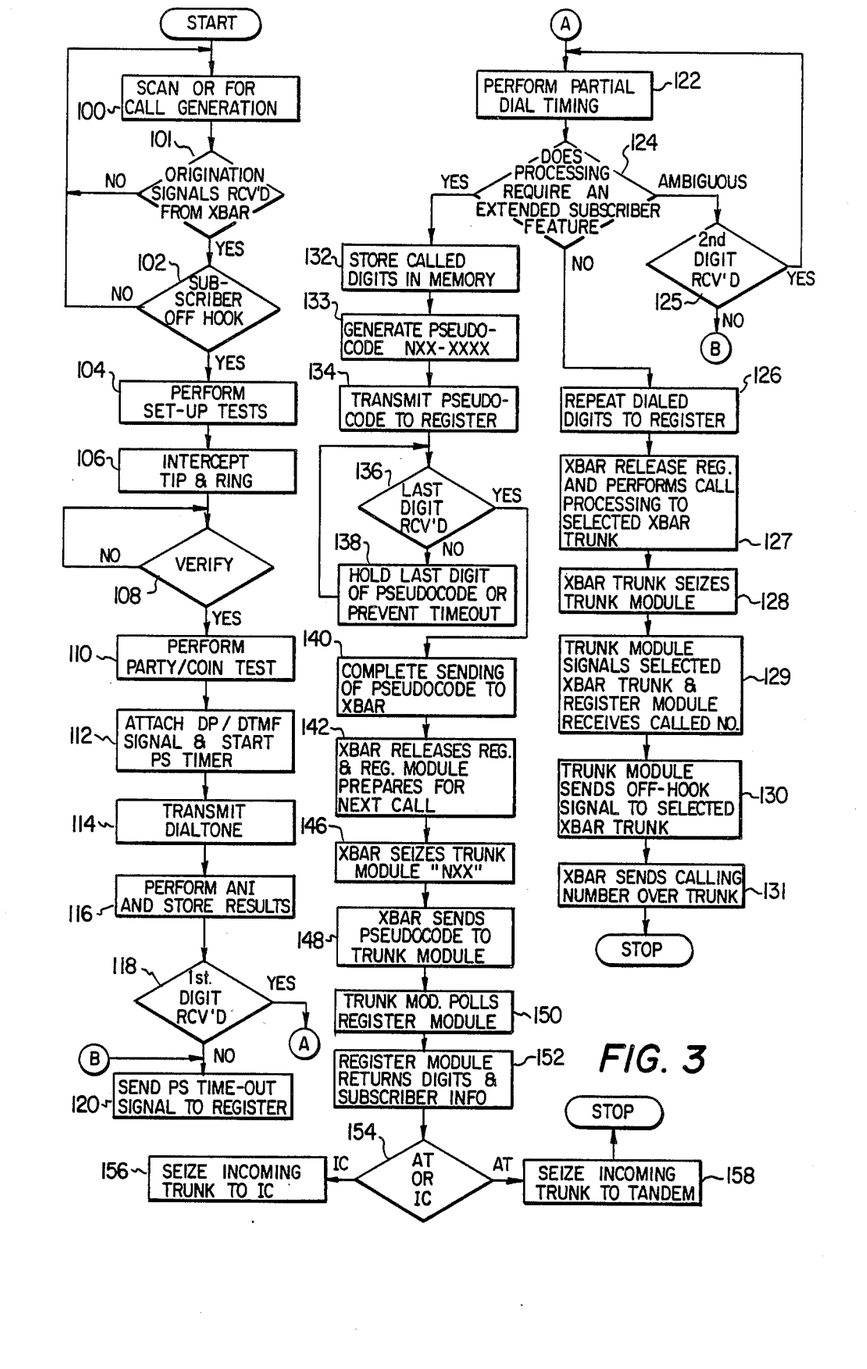
FIG. 3 is a flowchart diagram of a preferred method of the present invention for enhancing the operating capabilities of the existing central office to provide a subscriber with equal access to one or more interexchange carriers.

Referring now simultaneously to FIGS. 2 and 3, the operation of the register and trunk modules 30 and 32 will be described in detail. FIG. 3 is a flowchart diagram explaining how the modules 30 and 32 provide equal access capability to the otherwise non-conforming central office 12. In operation, the method begins at step 100 with the register module 30 continually scanning all originating registers (one of which is register 16) for a call origination. At step 101, a test is made to determine if organization signals have been received from the crossbar. If so, a test is made to determine if a subscriber has gone off-hook. If the result of either test at steps 101 or 102 is negative, the method returns to step 100. Upon recognition of a seizure in step 102, the register module 30 controls the marker 52 to perform all pre-setup tests at step 104.

The method continues at step 106 where the register module 30 intercepts the subscriber's tip and ring signals on conductors 68. Step 106 occurs only after the marker 52 determines that a proper originating register 16 has been selected. At step 108, a test is then made to verify that a loop exists between the subscriber line and the register module 30 and that the originating register 16 is supplying a battery feed to its side of the module 30. If all of these conditions exist, the method continues at step 110, where the register module performs a party-coin test. At step 112, the register module attaches a DP/DTMF signal via DP/DTMF send circuit 64 and starts a Permanent Signal (PS) timer therein. The register module 30 then transmits a dialtone to the calling subscriber at step 114 and performs automatic number identification (ANI) and storage of the subscriber information at step 116. As discussed above, the LENI code provided by the marker 52 is used by the line identification receiver 62 of the register module 30 as an address to a database which stores the subscriber's telephone number and identification of the subscriber's interexchange carrier. This information is required to provide equal access to the subscriber's interexchange carrier (IC).

At step 118, a test is made to determine if a digit has been dialed within a specified time. If not, the register module 30 sends a permanent signal (PS) time-out signal to the originating register 16 at step 120 to cause the register to call for the marker 52 to service the permanent signal. If the test at step 118 indicates that digits are being received, the register module also performs Partial Dial (PD) timing at step 122 until enough digits have been received to process the call to the originating register 16. If a Partial Dial (PD) time-out occurs, the register module sends the digits dialed to the originating register 16 followed by a time-out signal.

Referring back to FIG. 3, following receipt of the first digit, a test is made at step 124 to determine whether processing of the call requires an extended subscriber feature. By way of example, if the first digit of the call is a 0, 1 or 9, then processing of the call requires equal access. Although not described in detail, it should be appreciated that test 124 may be used for screening individual or grouped digits to evaluate whether an extended subscriber feature is called for. For example, in the equal access case, the module will screen groups of digits to determine whether the call is a 0+, 0−, 1+, 10XXX, 01+, 011+ or 950−XXXX type of call.

There will be some classes of operation, however, where the screening of just one digit (at step 118) will not provide enough information to enable the method to evaluate whether an extended subscriber feature is required. In such cases, the result of step 124 is ambiguous and thus a test is made at step 125 to determine if the second digit (or third digit, and so forth) has been received. If so, the method returns to step 122. However, if the result of step 125 is negative, the method returns to step 120. This operation, however, is not meant to be limiting as the method can process one or more received digits to make the extended subscriber feature determination.

If processing of the call does not require an extended subscriber feature, the method continues at step 126, where the register module 30 repeats the dialed digits to the originating register 16. At step 127, the crossbar releases the originating register 16 and the register module 30 prepares for the next call. The crossbar also performs call processing to the selected crossbar trunk. Thereafter, the crossbar trunk seizes the trunk module at step 128. At step 129, the trunk module 32 signals the selected crossbar trunk and the register module receives the called number. The trunk module 32 then sends an off-hook signal to the selected crossbar trunk at step 130. At step 131, the crossbar sends the calling number over the trunk and the method terminates.

On the other hand, if test 124 determines that processing of the call requires an extended subscriber feature, the method continues at step 132 to store the called number at the address location in memory where the other subscriber information was stored during step 116. At step 133, the register module generates a pseudocode number which will be used by the marker to route the call to a specific trunk route. The pseudocode signal is preferably a seven digit code, NXX-XXXX, with the first three digits thereof ("NXX") assigned by the specific central office to cause routing of the call to one or more trunk routes where trunk modules 32 are located. The last four digits ("XXXX") represent the specific register module 30 at which processing is taking place and the location in memory 60 where the called number and subscriber information resides. Although not shown in detail in FIG. 3, the method generates a different prefix NXX for the pseudocode signal depending on whether the call will be processed directly to an interexchange carrier or indirectly to a carrier through an access tandem route.

The method continues at step 134 where the register module 30 transmits the pseudocode signal to the originating register 16. At step 136, a test is made to determine whether the last digit of the called number has been received. If not, the method continues at step 138 to hold the last digit of the pseudocode in the module 30 or to otherwise prevent the originating register 16 from timing out. If the result of test 136 is positive, the method continues at step 140 to complete the sending of the pseudocode to the crossbar. At step 142, the crossbar releases the originating register 16 and the register module 30 prepares for the next call.

The method continues at step 146, where the crossbar seizes the appropriate trunk module depending on the value "NXX" of the pseudocode number. At step 148, the crossbar switch sends the pseudocode signal NXX-XXXX to the trunk module 32. Thereafter, at step 150, the trunk module 32 polls the appropriate register module 30 via the communications management module 38 to request transmission of the called number and the other subscriber information stored in memory 60. At step 152, the register module 30 returns this information to the trunk module for subsequent processing.

The trunk module then analyzes the called number and subscriber information at step 154 to determine whether the call will be routed directly to the interexchange carrier or directly to an access tandem. If the call will be routed directly, the method continues at step 156, where the register module seizes the incoming trunk to the interexchange carrier and processes the call per the appropriate carrier database. If the call is routed through the access tandem, the trunk module 32 seizes the incoming trunk to the tandem and performs appropriate signal processing at step 158.

Accordingly, it can be seen that a method and apparatus is described for enhancing operating capabilities of a central office in a telephone switching system to provide extended subscriber features. In a preferred embodiment, one such feature is "equal access" to one or more interexchange carriers. In this embodiment, the register module receives information (the LENI code) identifying the subscriber line following seizure of the originating register by the subscriber. Dialed digits (or signals representative thereof) are intercepted from the subscriber line and then analyzed to determine whether processing of the subscriber call requires equal access. If so, the register module generates a pseudocode number which includes the address location in the register memory of the stored digits and the subscriber information. Following the setting of the crossbar switch, the trunk module 32 then receives the pseudocode number from the crossbar for subsequent processing. The pseudocode digits received by the trunk module are not the customer dialed digits but rather identify the register module and the memory location therein which contains the actual dialed number and the subscriber information of the originating subscriber. The high speed communications datalink established between the register module and the trunk module (via the communications management module 38) allows the trunk module 32 to poll the register module 30 for the actual dialed digits and the subscriber information. The trunk module 32 then outputs the called number and the calling number in a predetermined format (e.g., Feature Group B, C or D format). The trunk module 32 also assembles call record data and transmits this data to the file management module 40 of FIG. 1 for format, storage and later retrieval of billing data.

According to another feature of the present invention, data is transmitted between the various system modules (or between tasks therein) via a unique messaging structure and routing method. For purposes of explanation, each of the modules discussed above with respect to FIGS. 1 and 2 can be considered nodes of a nodal network through which data messages are routed. For example, as discussed with respect to FIG. 3, when the trunk module 32 receives the pseudocode number from the crossbar switch, this module polls the register module 30 to receive the previously stored called number and the subscriber information. Such information is routed through another node of the network, the communications management module 38, having a plurality of ports 72a–72h. Such transmission of messages between the various nodes (and tasks thereof) of the network (or between tasks of a single node) is accomplished via the message structure shown in FIG. 4 and the routing routines set forth in FIGS. 5–10.

FIG. 4 discloses a representation of a preferred message structure of the present invention. Message 160 includes a message data field 162 which, in the preferred embodiment, may be up to one hundred twenty-two (122) bytes in length. The message data field 162 is of sufficient length to normally include all of the information intended to be transmitted between the nodes (or tasks therein). The data message 160 also includes a message length byte (LEN) 164 which contains the total number of bytes in the message including the length byte itself. The message length is typically one hundred twenty-eight (128) bytes.

The data message 160 includes a route class byte (CLAS) 166 which stores information to determine how the message is to be routed through the network. A destination node byte (DNOD) 168 identifies a destination node (via a logical identification number) where the data message is to be routed. The data message 160 also includes a source node byte (SNOD) 170 which contains the logical identification of the source node itself. This byte is not used to route the message, but is included to serve as a return address if the destination node must respond to the message. The data message 160 also includes a destination task byte (DTSK) 172 which contains the identity of the task within the destination node to which the data message is intended. The data message further includes a source task byte (STSK) 174 which contains the identity of the task in the source node which issued the data message. Like the source node, the source task field is not used for message routing, but merely identifies the task address for any return messages.

Data bytes 162, 164, 166, 168, 170, 172 and 174 form the basic structure of the data message 160 whether messages are to be routed internally (i.e., between two tasks of the same node), or externally (i.e., between different nodes of the network). However, where the data message 160 is to be routed externally, it is modified at the node to include additional fields by an external message task (ESTMSG) to be described below. In particular, data message 160 includes a start-of-message (SOM) byte 178, a frame control (CNTL) byte 180 and a check sum (CKSM) byte 182 for storing information used to control transfer of the message across a datalink between nodes. The SOM byte 176 has a predetermined hex value and the CNTL byte 178 contains link command or response frames for performing the datalink control functions and handling of message transfer.

In the preferred embodiment, the CNTL byte 178 supports one of the following types of command or response frames:

1. Information Command (I-Frame): used to transfer information in sequentially numbered frames;
2. Receive Ready Command and Response (RR): (a) indicates that the node is ready to receive an I-Frame, and (b) acknowledges all I-Frames previously received up to and including the received sequenced number minus one. The sequence number sent in a RR message is the number that the node expects to see in the I-Frame to be received. An RR frame is also sent to keep the datalink active if a predetermined timer has expired;
3. Reject Command and Response (REJ): used to request re-transmission of an I-Frame with the included sequence number. It also acknowledges all I-Frames previously received up to and including the received sequence number minus one;
4. Set Asynchronous Balance Mode Command (SABM): used to reset the link at both ends. Upon acknowledgement, the send and receive state numbers are reset to zero; and
5. Unnumbered Acknowledgement Response (UA): used to acknowledge the SABM command.

The above command and response frame provide (a) link initialization (i.e., the placing of both nodes of the link in a known state), (B) error control to ensure that messages reach their destination free of transmission errors and without loss of information, and (c) flow control to ensure that the data messages are not sent more rapidly than they can be received.

Figure 5:
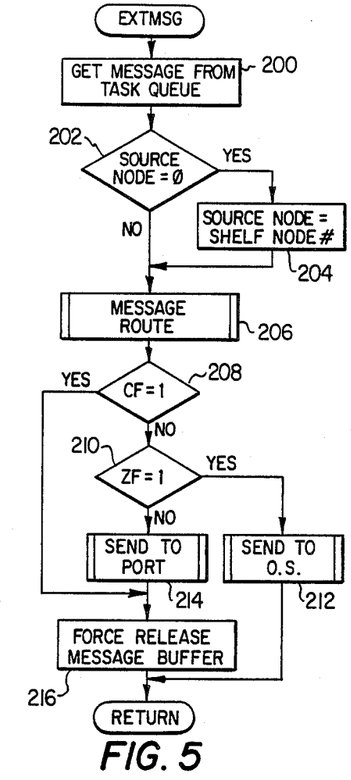
FIG. 5 is a simplified flowchart diagram of an external message routing routine (EXTMSG) used for routing messages between nodes of the network.

Referring now to FIG. 5, a simplified flowchart is shown of a preferred external message routing (EXTMSG) routine of the present invention. This routine is scheduled whenever an internal task at a node generates a data message which the operating system of the node decides must be routed to another node. This event can occur if the information in the destination node byte 168 is non-zero and not equal to the node's own number, or if the route class byte 166 is non-zero and the message is not bound to a task within the node.

The method begins when the task is activated by the node's operating system. At step 200, a data message is dequeued from a task queue in the node. For the register module 30, the task queue may form a portion of the memory 60 as shown in FIG. 2. In step 202, the source node byte 170 in the data message is checked to see if this byte is equal to zero. If so, the method continues at step 204 to replace the zero value with the node's own node number. This step relieves the task from the responsibility of filling the source node byte 170 in every message. The method continues at step 206 to route the message according to the information in the route class byte 166 and the destination node byte 168.

According to the invention, a primary routing table is compiled at each node of the network for identifying a port of the node from which a data message should be sent to reach each other node of the network via a shortest possible path. If desired, a secondary routing table may be compiled at each node for identifying a port of the node from which the data message should be sent to reach each other node of the network via a next shortest possible path. As will be described, the information in the primary and secondary routing tables is manipulated by the information in the data message control bytes described above to route the data message between the various nodes of the network.

Referring back to FIG. 5, routing is generally accomplished by using the primary and secondary route tables to find a route for the message while at the same time identifying a port number for use in sending the message to an intermediate node or to the desired destination node (if possible). As will be described in more detail below, the message route subroutine 206 generates a zero flag (ZF) having a value ZF="1" if the data message is intended to be routed to a task within the node. The flag ZF has a value ZF="0" if the data message is to be routed externally. The message route subroutine 206 also generates a carry flag (CF) which is set equal to "1" if no route exists for the message. If a route exists, CF="0."

At step 208, the carry flag CF is checked to determine whether a route exists for the message. If the carry flag is not equal to "0," a test is made at step 210 to determine whether the data message is to be routed internally. If so, the data message is sent to the operating system at step 212. If the data message is to be routed externally (to the port number identified by the message route subroutine 206), it is sent to the identified port at step 214. Following step 214, or if the carry flag indicates that no route exists for the data message, the method continues at step 216 to release a message buffer in which the data message was being held by the operating system.

Figure 6:
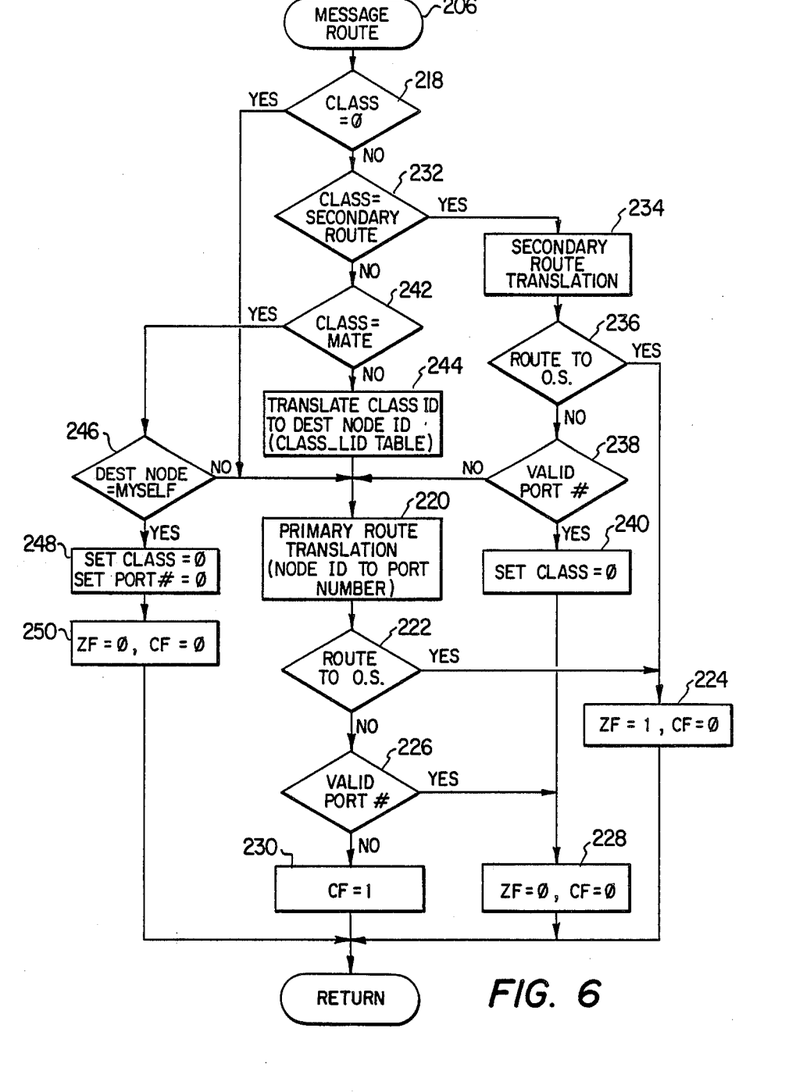
FIG. 6 is a detailed flowchart diagram of the message route subroutine of FIG. 5.

Referring now to FIG. 6, a detailed flowchart of the message route subroutine 206 of FIG. 5 is shown. At step 218, a test is made to determine whether the information in the route class byte 166 of the data message is equal to zero (the default route class). If the route class byte 166 is equal to zero, the data message is routed directly to its destination node as follows. At step 220, the primary routing table at the node uses the destination node identified in the destination node byte 168 as an index into the table which, as noted above, stores information identifying ports of the node from which data messages should be sent to reach each other node of the network via a shortest possible path. By convention, if a node does not exist in the network, then a value of "−1" is stored in the table at the address. Likewise, the value "−2" is stored at the address if the message is to be routed internally (i.e., between tasks). This would occur, for example, at the address of the node's own node number. Following the destination node-to-port number translation provided at step 220, the method continues at step 222 to determine whether the data message is to be routed internally between tasks of the node. If the result of test 222 indicates that the data message is to be routed internally, the zero flag is set to a first predetermined value (i.e., ZF="1") and the carry flag is set to a second predetermined value (i.e., CF="0") at step 224. If the result of the test at step 222 indicates that the message is not to be routed internally, a test 226 is made to determine whether the port identified is a valid port of the node. If the port identified is a valid port of the node, the subroutine continues at step 228 to set the zero flag and the carry flag equal to zero. However, if the port identified by the destination node-to-port number translation step 220 is not valid for the node, the method continues at step 230 to set the carry flag equal to "1". Following steps 224, 228 or 230, the subroutine returns to step 208 in the routine of FIG. 5.

As also described above, a secondary routing table may be compiled at each node for identifying a port of the node from which the data message should be sent to reach each other node of the network via a next shortest possible path. If the route class byte 166 is non-zero, (i.e., the outcome of the test at step 218 is negative), a test 232 is made to determine whether the information in the route class byte of the data message has a second predetermined value (indicating the need for secondary routine). If the message is to be routed using the secondary route, the destination node is again translated to a port number at step 234 using the secondary routing table. This table contains alternate port numbers from which the message can be sent to its destination node (or an intermediate node) using a next shortest possible path. At step 236, a test is again made to determine whether the secondary route is internal, and, if so, the method returns to step 224 to set the ZF="1" and CF="0." If the outcome of the test at step 236 is negative, a test is made at step 238 to determine whether the port identified at step 234 is valid for the node. If so, the route class byte 166 is set to zero at step 240 so that the data message will be routed via a primary route on subsequent legs of its journey to the destination node. Thereafter, the method continues at step 228. If the result of the test at step 238 indicates that the port identified at step 234 is invalid for the node, the method repeats steps 220, 222, 226 and 228 or 230 as described above.

The route class byte 166 may also contain a so-called mate class identification which indicates that the destination node is a redundant source node. In this case, the method includes an additional test at step 242 to determine whether the route class field byte contains the mate class identification. If not, a step 244 is performed to translate the route class byte to the destination node byte via a lookup table. The method when continues at step 220 as described above. If the class field byte contains the mate class identification, then a test is made at step 246 to determine whether the message is destined for the redundant node. If not, the subroutine defaults to step 220. However, if the test at step 246 indicates that the data message is destined for the redundant node, the route class byte and port numbers are set to zero at step 248. At step 250, the zero and carry flags are then set to zero and the subroutine returns to step 208 in the routine of FIG. 5.

Figure 7:
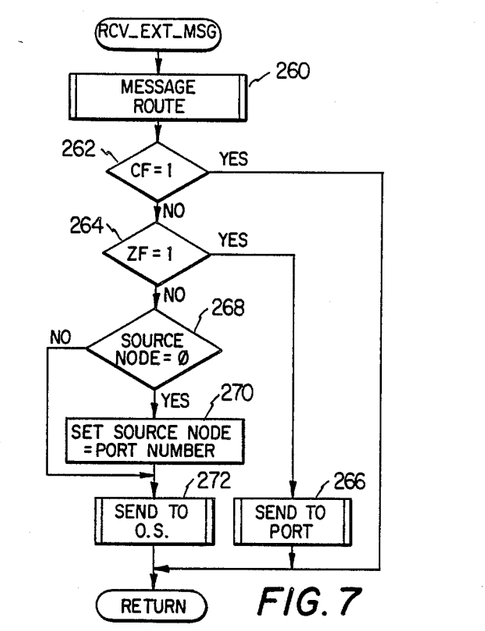
FIG. 7 is a simplified flowchart diagram of a receive external message (RCV EXT MSG) subroutine used by an intermediate node of the network to re-route a received data message.

Referring now to FIG. 7, a flowchart diagram is shown of a receive external message (RCV EXT MSG) subroutine which is used by an intermediate node (located between the original source node and the destination node) for use in retransmitting the data message along its journey to the destination node. At step 260, the message route subroutine of FIG. 6 is run. As described above, this subroutine generates the flag ZF=1 if the data message is to be routed internally and the flag CF=1 if no route exists for the message. At step 262, a test is made to determine whether CF=1. If so, the subroutine RCV EXT MSG terminates. If CF=0, a test is made at step 264 to determine whether ZF=1. If so, the subroutine continues at step 266 where the message is sent to the port identified by the message route subroutine 260. If routing is to be external (i.e., ZF="0"), a test is made at step 268 to determine if the source node byte equals zero. If so, at step 270, the subroutine sets the source node equal to the port number identifying the port at which the message was received. Following step 270, or if the result of the test at step 268 is negative, the data message is sent at step 272 to the operating system.

Figure 8:
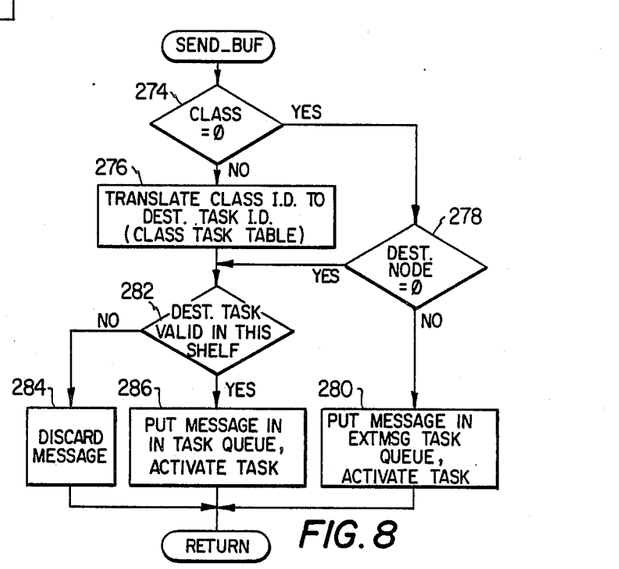
FIG. 8 is a simplified flowchart diagram of a subroutine (SEND BUF) for routing messages between tasks of a given node.

Referring now to FIG. 8, a flowchart is shown of a preferred routine (SEND BUF) for routing messages between tasks of a give node. This internal routing routine begins at step 274 where a test is made to determine whether the class field byte in the data message to be routed is equal to zero. If not, the routine continues at step 276 to translate the class identification byte to the destination node byte 172 via a lookup table. If, however, the class byte is equal to zero, a test is made at step 278 to determine whether the destination node is equal to zero. If not, the message is placed in an external task queue and the task is activated at step 280. If the result of the test 278 is positive, or following the translation step at 276, a test is made at step 282 to determine whether the destination task is valid for the node. If not, the message is discarded a step 284. However, if the destination task is valid for the node, the message is put in the task queue and the task is activated at step 286.

According to another feature of the invention, a serial communications protocol handler is provided to manage the low-level point-to-point data transfer between two nodes. According to the protocol, messages are received and transmitted on a byte-to-byte basis, and appropriate routines are provided at the transmitting and receiving links (nodes) for forming or reconstructing messages based on the transmitted or received data bytes.

Figure 9:
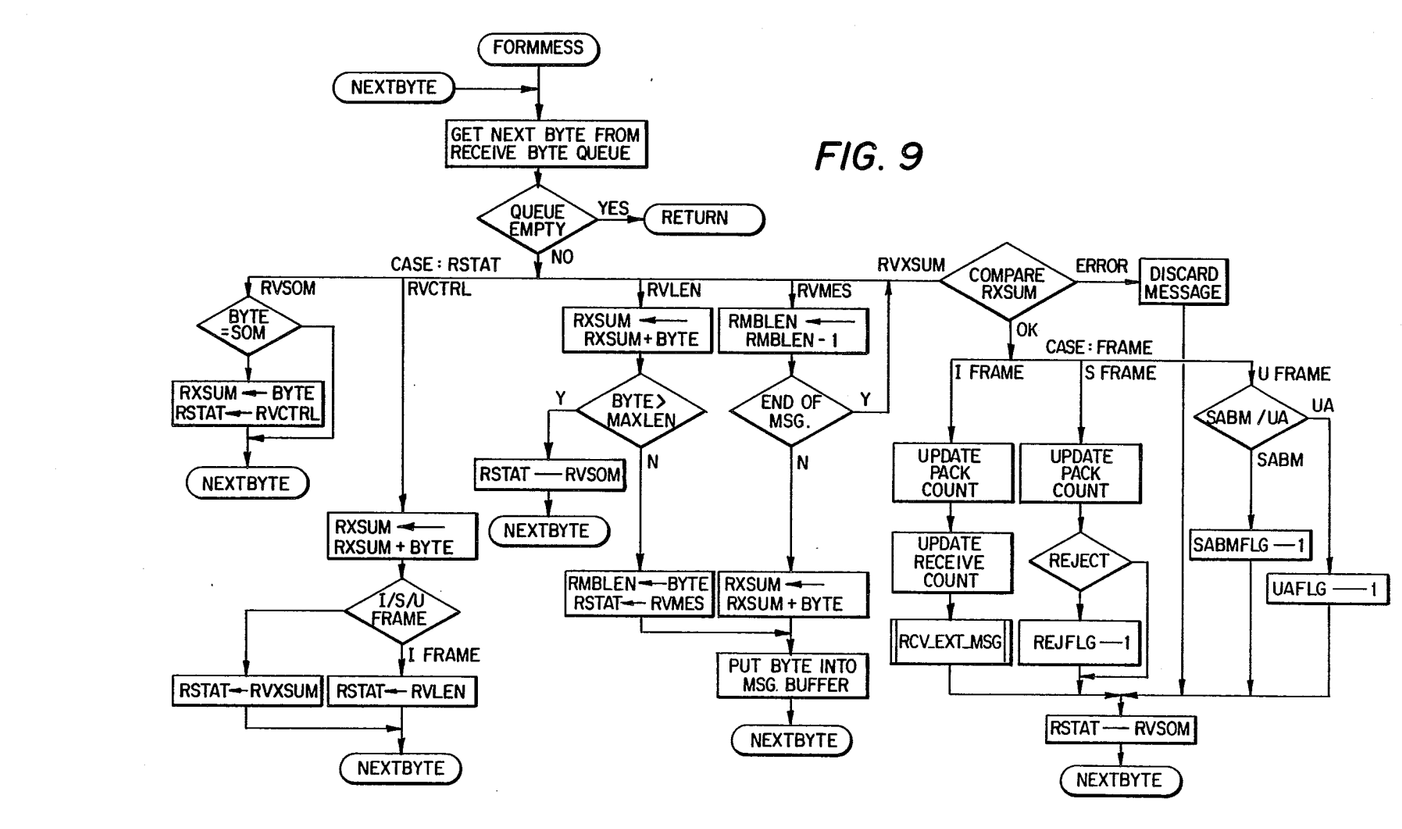
FIG. 9 is a detailed flowchart diagram of a receive handler task (FORMMESS) for processing data bytes received over a datalink between two nodes and forming messages therefrom.
Figure 10:
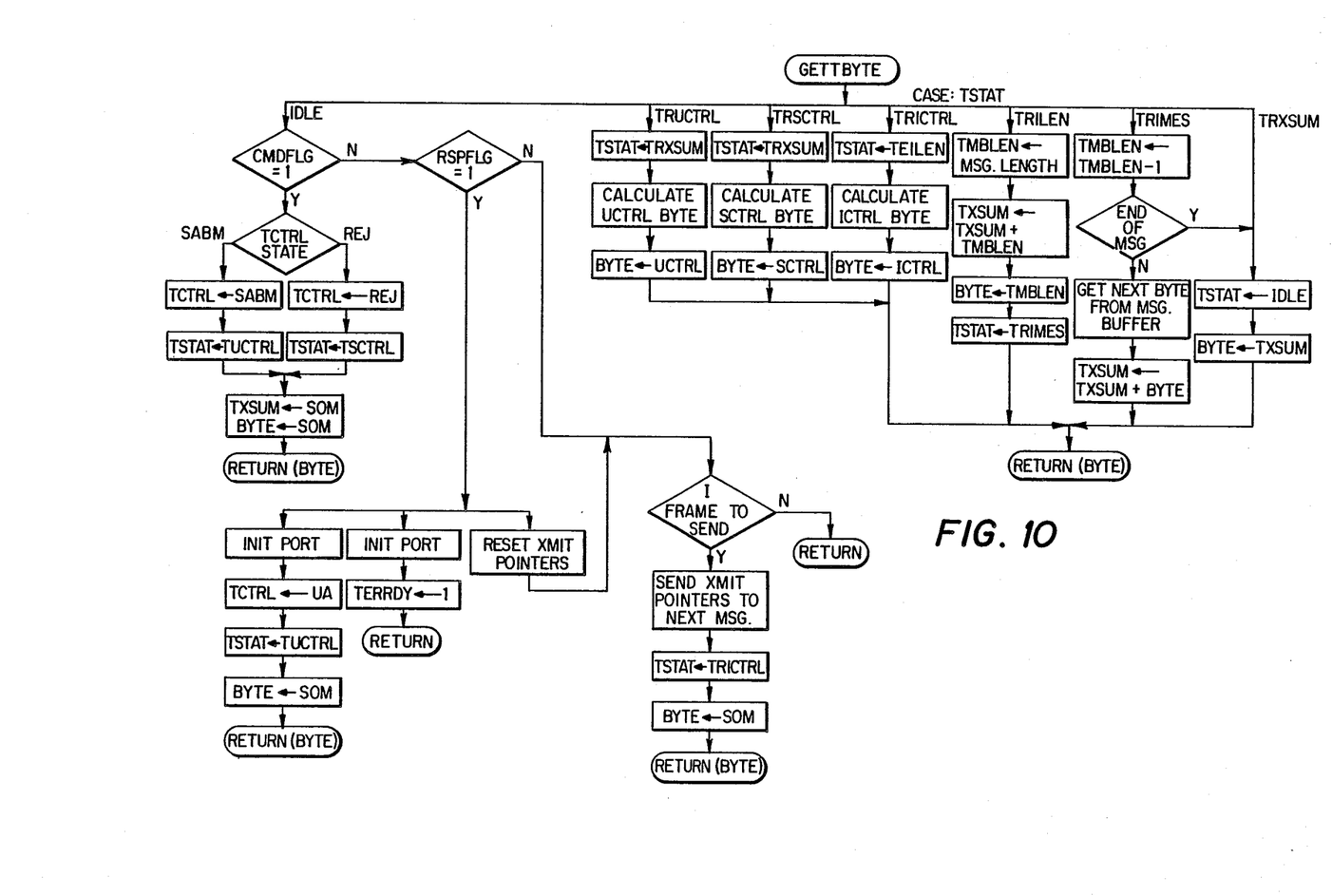
FIG. 10 is a detailed flowchart diagram of a transmit handler task (GETTBYTE) for processing data bytes for transmission over a datalink between two nodes.

The reception and transmission of each data byte is handled on an interrupt basis. When each byte is received from the link, it is put in a received byte queue and a receive handler task (FORMMESS) as shown in FIG. 9 is scheduled for later execution by the operating system. Once activated, the FORMMESS routine takes bytes out of the received byte queue and attempts to form a message from these bytes. When a data message is fully assembled, the procedure RCV EXT MSG of FIG. 7 is called and the message is routed to its destination.

Data messages to be routed are placed in a transmit message queue by the send-to-port step 270 of FIG. 7. Such messages are then made available for transmission by the procedure GETTBYTE of FIG. 10. This procedure, which is called during a transmit interrupt, obtains the bytes for transmission from the transmit message queue. The routine GETTBYTE of FIG. 10 works in conjunction with the routine FORMMESS of FIG. 9 to provide automatic link-level acknowledgment handshaking to ensure integrity of message transmission and reception.

Although the invention has been described and illustrated in detail, it is to be understood that the same is by of illustration and example only and is not to be taken by way of limitation. The spirit and scope of this invention are to be limited only by the terms of the appended claims.

We claim:

1. An apparatus for enhancing the operation of a central office in a telephone switching system to provide one or more extended subscriber features, the central office including a switch element for connecting a subscriber line to one of a plurality of outgoing trunks and control means for controlling the switch element, comprising:

a register module interposed between the subscriber line and the control means of the central office, said register module receiving subscriber signals from the subscriber line intended for the central office and including:
  (a) a line identification receiver connected to receive line information from the control means identifying the subscriber line and for translating the line information into automatic number identification and pre-subscription information,
  (b) a memory for storing the subscriber signals, the automatic number identification and the pre-subscription information at one of a plurality of addressable locations,
  (c) a central processing unit for analyzing the subscriber signals to determine whether processing of the subscriber signals requires an extended subscriber feature and for generating a coded signal if processing of the subscriber signals requires an extended subscriber feature, the coded signal including the address location in the memory where the subscriber signals, the automatic number identification and the pre-subscription information resides,
  (d) means for connecting the coded signal to the control means and the switch element;
a trunk module interposed between the switch element and the plurality of outgoing trunks for receiving the coded signal from the switch element; and
communication management means connected between the register module and the trunk module for routing the subscriber signals, the automatic number identification and the pre-subscription information to the trunk module in response to receiving the coded signal from said trunk module to thereby select an outgoing trunk.

2. The apparatus for enhancing the operation of a central office as described in claim 1 wherein the trunk module comprises:
means for polling the memory for storing to request transmission of the subscriber signals, the automatic number identification, and the pre-subscription information; and
means for receiving the subscriber signals, the automatic number identification, and the pre-subscription information and in response thereto outputting a signal in a predetermined format.

3. The apparatus for enhancing the operation of a central office as described in claim 2 wherein the signal output from the means for receiving includes the subscriber signals, the automatic number identification, and the pre-subscription information.

4. The apparatus for enhancing the operation of a central office as described in claim 1 further including file management means connected to said communication management means for storing data, subscriber information and billing information used by the telephone switching system.

5. The apparatus for enhancing the operation of a central office as described in claim 1 further including maintenance means connected to said communication management means for inputting information for maintaining the central office.

6. The apparatus for enhancing the operation of a central office as described in claim 1 further including:
means responsive to the control means for determining when a subscriber has gone off-hook; and means responsive to the subscriber going off-hook for transmitting a dialtone to the subscriber prior to receiving subscriber signals from the subscriber line.

7. A method for enhancing the operation of a central office in a telephone switching system to provide one or more extended subscriber features such as equal access, the central office including a switch for connecting a subscriber line to one of a plurality of outgoing trunks and control means for controlling the switch, comprising the steps of:

receiving in a register module line information identifying the subscriber following seizure of the control means by the subscriber line;

intercepting in the register module subscriber signals from the subscriber line intended for the central office;

translating in the register module the line information into subscriber information, the subscriber information including a subscriber's identifying number and an interexchange carrier;

storing in the register module the subscriber signals and the subscriber information in a memory having a plurality of address locations;

analyzing in the register module the subscriber signals to determine whether processing of the subscriber signals requires an extended subscriber feature;

if processing of the subscriber signals requires an extended subscriber feature, generating a coded signal including the address location of the stored subscriber signals and the subscriber information;

connecting the coded signal from the register module to the control means and the switch of the central office;

transmitting the coded signal from the switch to a trunk module interposed between the switch and the plurality of outgoing trunks; and routing data including the subscriber signals and the subscriber information through a communication management means connected between the register module and the trunk module in response to the coded signal transmitted to the trunk module.

8. The method for enhancing the operation of a central office as described in claim 7 further including the step of:

transmitting a dialtone to the subscriber following seizure of the control means and prior to intercepting the subscriber signals from the subscriber line.

9. A method for routing data between nodes of a network, each of the nodeshaving one or more ports associated therewith, comprising the steps of:

compiling a primary routing table at each node for identifying a port of the node from which a data message should be sent to reach each node of the network via a shortest possible path;

generating at a node a data message to be routed, the data message including a first portion to control routing of the data message and a second portion for identifying a destination node where the data message is to be routed; and using the information in the first and second portions of the data message to identify the port of the node from which the message should be routed to reach the destination node over the shortest possible path.

10. The method for routing data between nodes of a network as described in claim 9 further including the steps of:

determining whether a valid route exists for the data message; and if a valid route exists for the data message, determining whether the data message is to be routed between nodes of the network.

11. The method for routing data between nodes of a network as described in claim 10 further including the steps of:

if the data message is to be routed between nodes of the network, sending the data message to the identified port; and if the data message is not to be routed between nodes of the network, sending the data message to an operating system at the node generating the message.

12. The method for routing data between nodes of a network as described in claim 9 further including the step of:

compiling a secondary routing table at each node for identifying a port of the node from which the data message should be sent to reach each other node of the network via a next shortest possible path.

13. The method for routing data between nodes of a network as described in claim 12 further including the step of:

using the information in the first and second portions of the data message to identify the port of the node from which the message should be routed to reach the destination node over the next shortest possible path.

14. The method for routing data between nodes of a network as described in claim 13 further including the steps of:

determining whether a valid secondary route exists for the data message; and if a valid secondary route exists, determining whether the data message is to be routed between nodes of the network.

15. The method for routing data between nodes of a network as described in claim 14 further including the steps of:

if the data message is to be routed between nodes of the network, sending the data message to the identified port; and if the data message is not to be routed between nodes of the network, sending the message to an operating system of the node generating the message.

16. A method for routing data between nodes of a network, each of the nodes having one or more ports associated therewith, comprising the steps of:

(a) compiling a primary routing table at each node for identifying a port of the node from which a data message should be sent to reach each other node of the network via a shortest possible path;

(b) generating at a node a data message to be routed, the data message including a first portion for storing information to control routing of the data message and a second portion for identifying a destination node where the data message is to be routed;

(c) determining whether the information in the first portion of the data message has a first predetermined value; and (d) if the information in the first portion of the data message has a first predetermined value, using the information in the second portion of the data message as an index to the primary routing table to identify the port of the node from which the message should be routed to reach the destination node over the shortest possible path.

17. The method for routing data between nodes of a network as described in claim 16 further including the steps of:
(e) determining whether the data message is to be routed internally in the node generating the message;
(f) if the data message is to be routed internally in the node generating the message, setting a first flage to a first predetermined value and setting a second flag to a second predetermined value;
(g) if the data message is not to be routed internally in the node generating the message, determining whether the port identified in step (d) is a valid port of the node;
(h) if the port identified in step (d) is a valid port of the node generating the message, setting the first and second flags to the second predetermined value; and
(i) if the port identified in step (d) is not a valid port of the node generating the message, setting the second flag to the first predetermined value.

18. The method for routing data between nodes of a network as described in claim 17 further including the step of:
(j) compiling a secondary routing table at each node for identifying a port of the node from which the data message should be sent to reach each other node of the network via a next shortest possible path.

19. The method for routing data between nodes of a network as described in claim 18, further including the steps of:
(k) if the information in the first portion of the data message does not have a first predetermined value, determining whether the information in the first portion of the data message has a second predetermined value; and
(l) if the information in the first portion of the data message has a second predetermined value, using the information in the second portion of the data message as an index to the secondary routing table to identify the port of the node from which the message should be routed to reach the destination node over the next shortest possible path.

20. The method for routing data between nodes of a network as described in claim 19, further including the steps of:
(m) determining whether the data message is to be routed internally in the node generating the message;
(n) if the data message is to be routed internally in the node generating the message, setting the first flag to the first predetermined value and setting the second flag to the second predetermined value;
(o) if the data message is not to be routed internally in the node generating the message, determining whether the port identified in step (l) is a valid port of the node;
(p) if the port identified in step (l) is not a valid port of the node, repeating steps (d) through (i);
(q) if the port identified in step (l) is a valid port of the node, setting the information in the first portion of the data message to the first predetermined value; and
(r) setting the first and second flags to the second predetermined value.

21. A method for routing data between nodes of a network, each of the nodes having one or more ports associated therewith, comprising the steps of:
generating at a node a data message to be routed, the data message including:
a first portion to control routing of the data message;
a second portion for identifying a destination node where the data message is to be routed;
a third portion for identifying a source node from which the data message originates; and
a fourth portion for storing the data to be routed in the data message; and
routing the data message from the port of the node at which the message was generated to reach the destination node over the shortest possible path.

22. The method for routing data between nodes of a network as described in claim 21 wherein the data message further includes:
a fifth portion for identifying a task in the destination node to which the data message is intended to be routed; and
a sixth portion for identifying a task in the source node from which the message originates.

23. The method for routing data between nodes of a network as described in claim 21 wherein the data message further includes:
a seventh portion including information for establishing a link between the source and destination nodes; and
an eighth portion identifying the length of the data message.

24. The method for routing data between nodes of a network as described in claim 23 wherein the data message further includes:
a ninth portion for identifying a start of the data message; and
a tenth portion for identifying an end of the data message.

25. A method for routing data between nodes of a network, each of the nodes having one or more ports associated therewith, comprising the steps of:
generating at a node a data message to be routed, the data message including:
a class field to control routing of the data message;
a destination node field for identifying a destination node where the data message is to be routed;
a source node field for identifying a source node from which the data message originates;
a destination task field for identifying a task at the destination node to which the data message is intended to be routed;
a source task field for identifying a task at the source node from which the data message originates; and
at least one message field for storing the data to be routed in the data message; and
routing the data message fro a port of the node at which the message was generated to reach the destination node over the shortest possible path.

26. The method for routing data between nodes of a network as described in claim 25 wherein the data message further includes:
a start-of-message byte field for identifying a start of the data message;
a control byte field for storing information used to establish a link between the source and destination nodes; and
a check sum byte field for identifying an end of the message.

* * * * *

UNITED STATES PATENT AND TRADEMARK OFFICE
CERTIFICATE OF CORRECTION

PATENT NO. : 4,782,519

DATED : November 1, 1988

INVENTOR(S) : RAJENDRA PATEL, ET AL.

It is certified that error appears in the above-identified patent and that said Letters Patent is hereby corrected as shown below:

```
Column  1, line 68, change "as" to -- an --.
Column  2, line 50, change "modes" to -- nodes --.
Column  3, line 61, change "is" to -- in --.
Column 12, line 40, change "when" to -- then --.
Column 13, line 21, change "a" to -- at --.
Column 15, line 52, change "nodeshaving" to -- nodes having --.
Column 15, line 57, after "each" insert -- other --.
Column 17, line 12, change "flage" to --flag --.
Column 18, line 55, change "fro" to -- from --.
```

Signed and Sealed this

Eighteenth Day of April, 1989

Attest:

DONALD J. QUIGG

*Attesting Officer*      *Commissioner of Patents and Trademarks*